No. 859,901. PATENTED JULY 9, 1907.
G. W. CLINE.
CATTLE GUARD.
APPLICATION FILED FEB. 18, 1907.
4 SHEETS—SHEET 1.
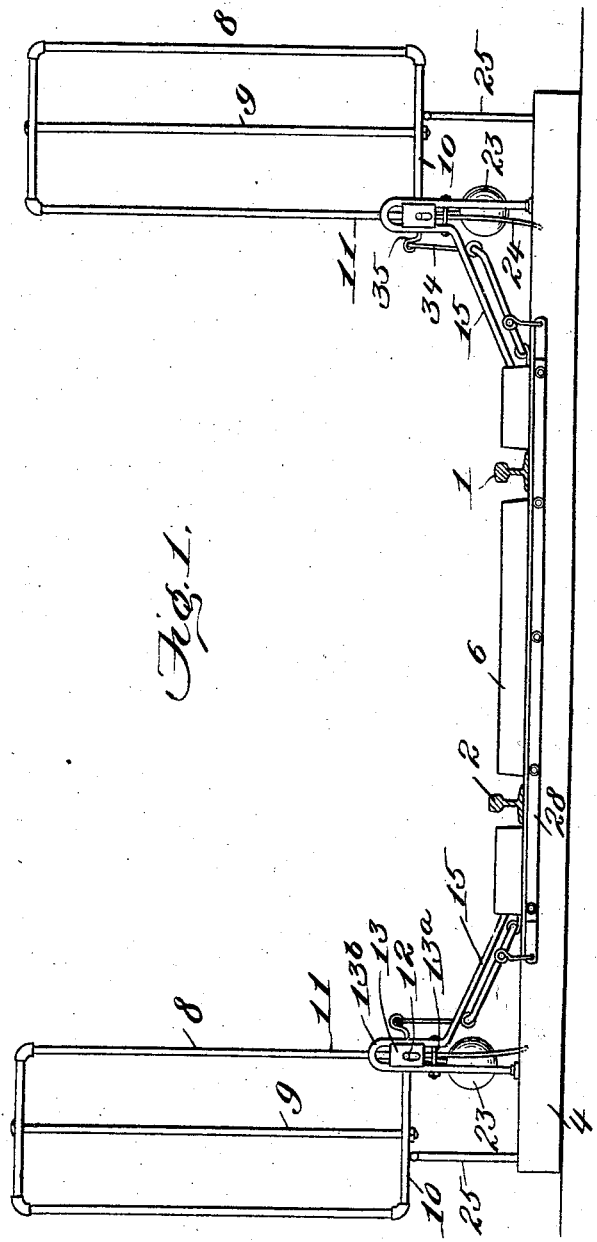
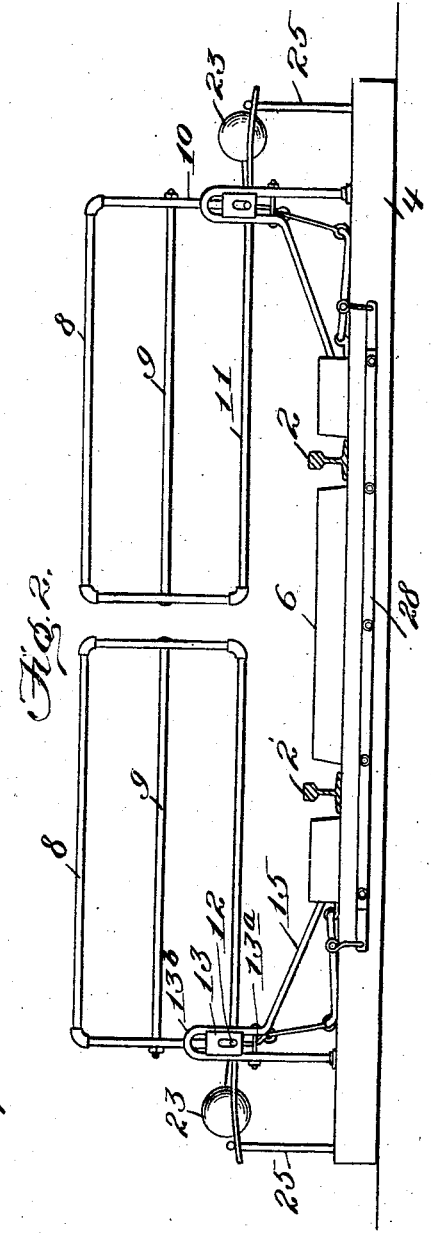
Witnesses:
Inventor
George W. Cline
By James L. Norris
Atty.

No. 859,901. PATENTED JULY 9, 1907.
G. W. CLINE.
CATTLE GUARD.
APPLICATION FILED FEB. 18, 1907.
4 SHEETS—SHEET 2.
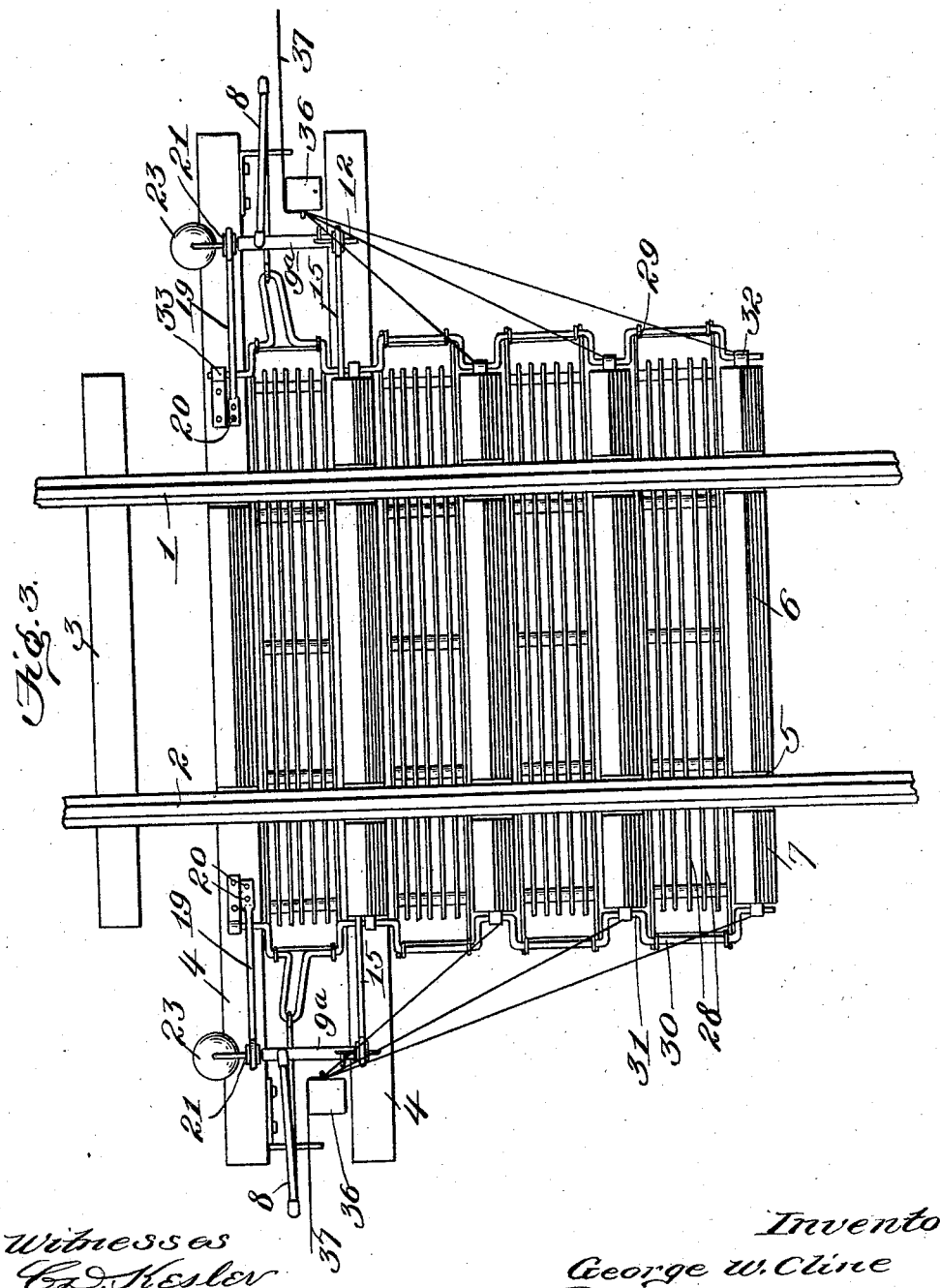
Witnesses
C. D. Kesler
Inventor
George W. Cline
By
James L. Norris.
Atty

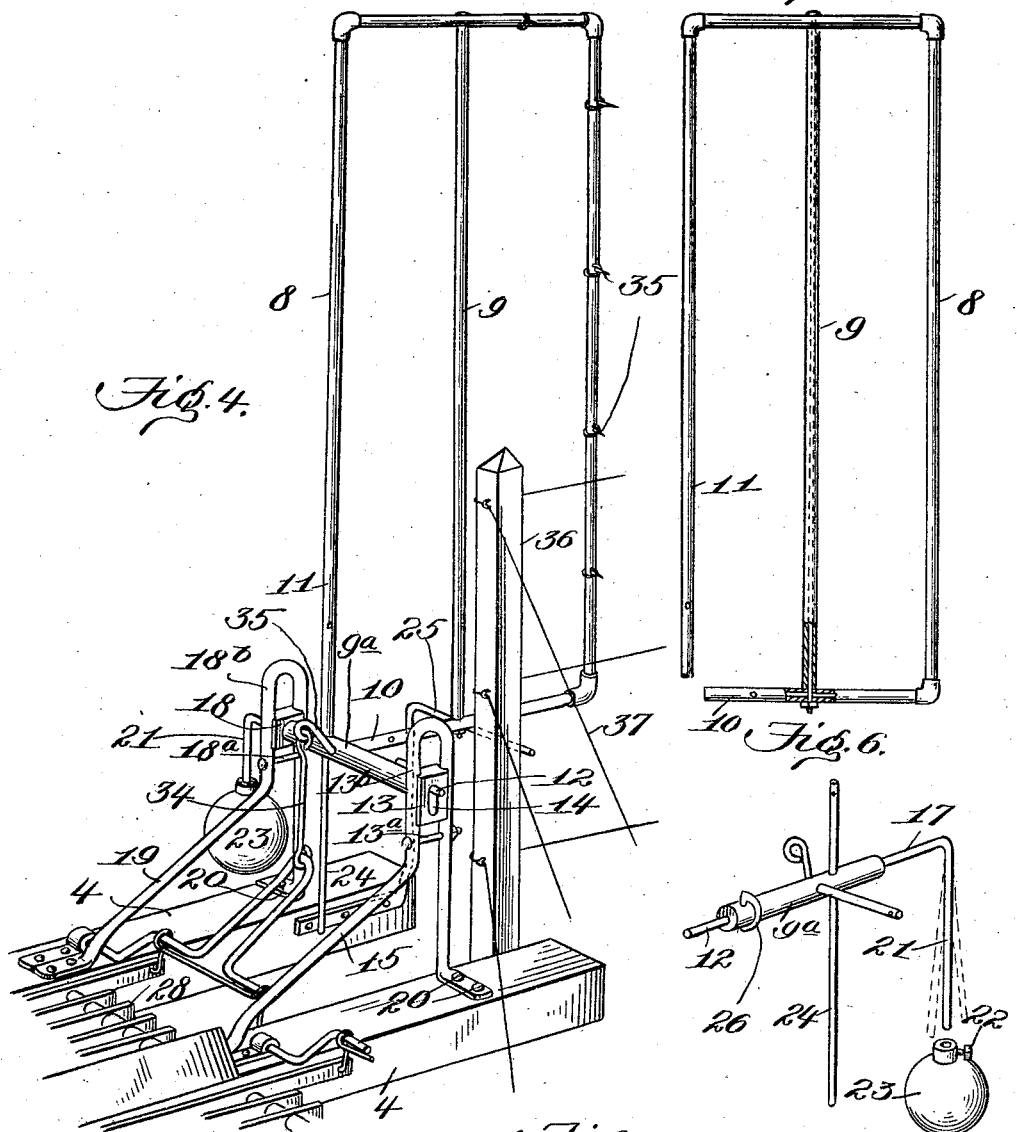

No. 859,901. PATENTED JULY 9, 1907.
G. W. CLINE.
CATTLE GUARD.
APPLICATION FILED FEB. 18, 1907.
4 SHEETS—SHEET 4.
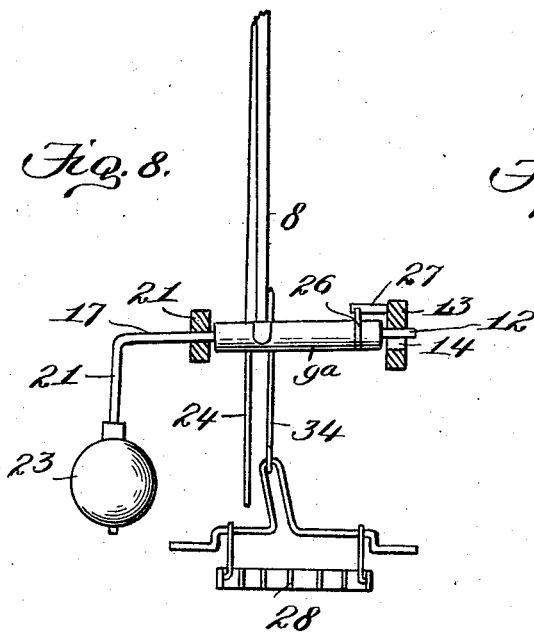
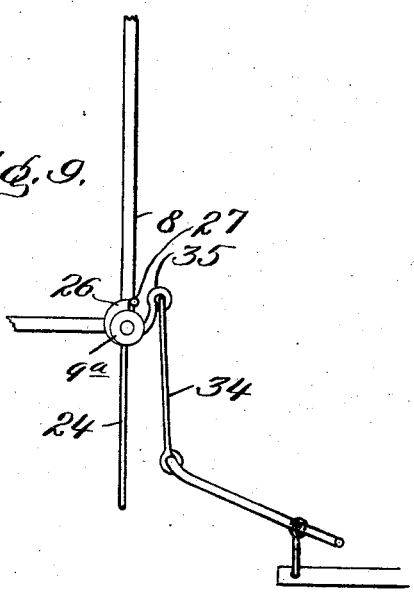
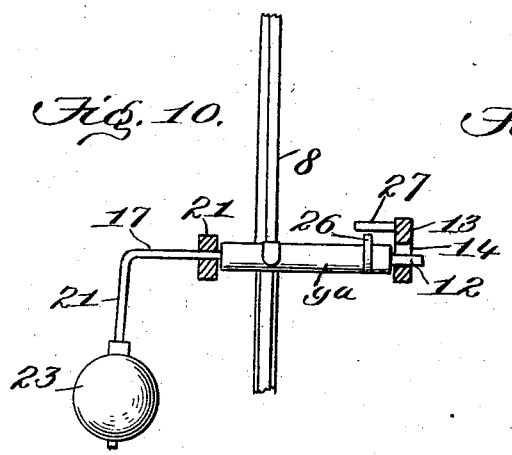
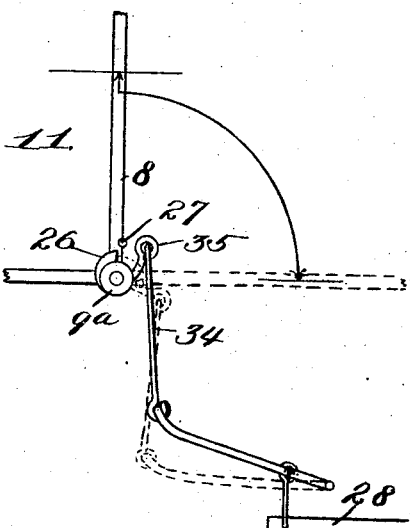
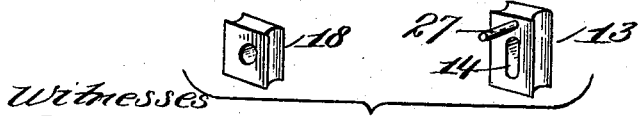
Witnesses
Inventor
George W. Cline
By
James L. Norris

UNITED STATES PATENT OFFICE.

GEORGE W. CLINE, OF SANDPOINT, IDAHO, ASSIGNOR TO AUTOMATIC CATTLE GUARD COMPANY, OF SANDPOINT, IDAHO, A CORPORATION OF IDAHO.

CATTLE-GUARD.

No. 859,901.      Specification of Letters Patent.      Patented July 9, 1907.

Application filed February 18, 1907. Serial No. 358,089.

*To all whom it may concern:*

Be it known that I, GEORGE W. CLINE, a citizen of the United States, residing at Sandpoint, in the county of Kootenai and State of Idaho, have invented new and useful Improvements in Cattle-Guards, of which the following is a specification.

This invention relates to cattle guards for preventing cattle and other stock from passing on railroad tracks or from one field to another, and the object thereof is to provide in a manner as hereinafter set forth an automatically operable guard embodying means whereby, as the animal steps upon the guard, said means will be caused to automatically extend transversely of the track and effectually prevent further passage of the animal, said means being further adapted to automatically return to normal position as soon as the animal steps off the guard.

A further object of the invention is to provide a cattle guard for the purpose set forth which shall be simple in its construction, strong, durable, automatic in its operation, efficient in its use, readily set up, and comparatively inexpensive.

With the foregoing and other objects in view, the invention consists in the novel construction, combination, and arrangement of parts hereinafter more specifically described and illustrated in the accompanying drawings, wherein is shown the preferred embodiment of the invention, but it is to be understood that changes, variations, and modifications can be resorted to which come within the scope of the claims hereunto appended.

In describing the invention in detail, reference is had to the accompanying drawings wherein like reference characters denote corresponding parts throughout the several figures, and in which Figure 1 is a transverse section of a railway track showing the adaptation thereto of a cattle guard in accordance with this invention, the guard being open. Fig. 2 is a like view with the guard closed. Fig. 3 is a plan view of the guard arranged in connection with a railway track. Fig. 4 is a perspective view of a portion of the guard. Fig. 5 is a detail of one of the gates. Fig. 6 is a detail showing the gate supporting and shifting shaft. Fig. 7 is a detail of one end of one of the yielding treads. Fig. 8 is a view showing the gate in its normal or locked position. Fig. 9 is a like view looking towards one end of the supporting and shifting shaft for the gate. Fig. 10 is a view similar to Fig. 8 with the gate released. Fig. 11 is a view similar to Fig. 9 with the gate released, and also showing in dotted lines the gate swung to closing position. Fig. 12 is a detail illustrating the bearings for the gate supporting and shifting shaft.

Referring to the drawings by reference characters, 1 and 2 denote the rails of a railway track and 3, 4, and 5 the cross-ties. The ties 4 are of such length as to project from each side of the track and that portion between the rails 1, 2, as well as the intermediate portion of the ties 5, are of inverted V-shape, as at 6. The outer portions of the ties 5 as well as a part of the outer portion of one of the ties 4 are also of inverted V-shape in cross-section, as at 7, for the purpose of deflecting an animal's hoof.

The cattle guard consists of a pair of swinging gates which are adapted to be projected transversely across the track, and, when projected in such manner, the gates assume a position in alinement with each other.

As the supporting and shifting mechanism for each gate is of the same construction, but one will be described, the same reference characters applying to both. Each of the gates is indicated by the reference character 8, is substantially rectangular in contour, and of skeleton formation; that is to say, each gate is formed of a rectangular frame having a longitudinally extending strengthening bar 9. If desirable, the bars of the frame may be provided with barbs 35. A combined supporting and counterbalanced shifting shaft $9^a$ is provided for the gate 8. One of the side bars 10 of the gate 8 is secured at one end to one side of the shaft $9^a$ and the bottom bar 11 of the gate 8 is secured to the top of the shaft $9^a$; by such arrangement, one corner, which is the outer lower corner, of the gate is attached to the shaft $9^a$. A journal 12 is provided for the shaft $9^a$ and extends through a bearing block 13 having a vertically extending slot 14, the said block 13 being adjustably secured by the bolt $13^a$ in the upper end $13^b$ of the supporting bracket 15 which is fixed to the upper face of one of the projecting ends of a cross-tie 4, holdfast devices 20 being provided for securing the bracket 15 to the cross-tie 4. The other end of the shaft 12 is formed with a journal 17 which extends through a bearing block 18 adjustably secured by the bolt $18^a$ in the upper end $18^b$ of a supporting bracket 19 attached to the upper face of the other of the cross-ties 4, holdfast devices 20 being provided for such purpose. By such an arrangement, one end of the shaft $9^a$ can vertically move in the slot 14. The journal 17 is of such length as to enable the same to be bent downwardly, as at 21, and to the said depending portion 21 is adjustably connected, through the medium of the set-screw 22, a counterbalance weight 23, the function of which is to automatically return the shaft $9^a$ to normal position. Depending from the shaft $9^a$ is an arm 24 for limiting the movement of the shaft $9^a$ when the same is shifted to swing the gate 8 to closing position, the arm 24, during such movement, being adapted to engage the angular upper end of a stop-bar 25 having an angular lower end secured to one side of one of the cross-ties 4 at the end thereof. The stop-bar 25 also acts as a means to limit the return movement of the gate 8 for the reason that the stop-bar 25 is arranged in the path of the side bar 10 of the gate. The stop-bar 25 further acts as a means for supporting the gate 8 when the latter is swung to an elevated position.

A means is provided for automatically locking the gate 8 from movement when the latter is swung to a vertical position, so that the gates cannot be blown across the track from the wind or accidentally moved, and such means consists of a protuberance 26 projecting from one end of the shaft 9ᵃ and which is adapted to abut against an inwardly extending lug 27 carried by the block 13. When the gate 8 is returned to normal or rather swung to a vertical position, the lug 27 projects in the path of the protuberance 26, so that, if an attempt is made to swing the gate downwardly, such movement will be arrested by the abutting of the protuberance 26 against the lug 27. The protuberance 26 is moved so as to pass by the lug 27 when the shaft 9ᵃ is shifted by an operating means to be hereinafter referred to. The first movement imparted to the shaft 9ᵃ by the operating mechanism is such as to cause that end of the shaft provided with the journal 12 to fall, the slot 14 providing for such action. The lowering of such end of the shaft 9ᵃ will enable the protuberance 26 to pass under the lug 27 when the shaft 9ᵃ is shifted to swing the gate to closing position. After the gate has been swung to closing position and released, the weight 23 will cause the gate to return to its normal position; that is to say, cause the gate to be swung to a vertical position, and the action of the weight 23 will also cause that end of the shaft 9ᵃ provided with the journal 12 to be elevated, as shown in Fig. 8, so as to cause the lug 27 to be in the path of the protuberance 26.

The operating mechanism which is common to both of the gates 8 and shafts 9ᵃ consists of a plurality of vertically yielding treads 28 each consisting of a slatted frame interposed between pairs of cross-ties and each of which is connected at each end, as at 29, to a crank portion 30 of a shaft 31. The shafts 31 are pivotally connected to the ends of the cross-ties 5 by the keepers 32 and upon the upper face of the cross-ties 4 by the keepers 33. The crank portion of each of the shafts 31, which is positioned between the cross-ties 4, is connected by a link 34 to an eye 35 projecting from the shaft 9ᵃ. By such construction, when an animal treads upon one of the slatted frames, the said frame will yield, consequently rocking the shafts 31, which in turn will lower the links 34 and thereby rock the shafts 9ᵃ. These latter will then swing the gates 8 to closing position; that is to say, cause the gates 8 to extend transversely of the railway track. The weights 23 not only act as a means to return the shafts 9ᵃ to normal or inoperative position, but also constitute means for returning the shafts 31 and yieldable treads 28 to normal position, as will be evident.

The cattle guard may be positioned between a pair of fence posts 36, so that each of the gates when in an upright position will be arranged at one side of the post, as shown in Fig. 4, and the wires 37 which were between the posts can be severed, extended downwardly at an inclination, and secured to the ends of the cross-ties 5, which would act as a means to prevent the cattle mounting the guard from the side.

Although the guard is shown in single form, that is to say, having the yielding treads only at one side of the gate, yet the guard can be extended so as to form what may be termed a double guard, so that the treads will be positioned at both sides of the gate in order to guard approach from both directions. As this is an obvious expedient, it is thought unnecessary to illustrate the same.

From the foregoing description, taken in connection with the accompanying drawings, it will be evident that an exceedingly simple means is provided which will be entirely automatic in operation and absolutely preclude the passage of animals from one field to another along a railway, as, when the gates are swung to a position to extend transversely of the railway track, the passage of the cattle will be arrested.

What I claim is:

1. A cattle guard comprising a pair of shafts, a pair of gates each having one corner thereof connected to one of the shafts, a pressure operated means for shifting said shafts thereby moving said gates to a position transverse of a railway track, a counter-weight carried by each of the shafts for automatically returning said shafts, gates and means to normal position when pressure is relieved from said means, means for automatically locking the gates in inoperative position, and means for causing the automatic release of the gates at the beginning of the operation of said pressure operated means.

2. A cattle guard comprising a pair of shafts, a pair of gates each having one corner thereof connected to one of the shafts, a pressure operated means for shifting said shafts thereby moving said gates to a position transversely of a railway track, a counter-weight carried by each of the shafts for automatically returning said shafts, gates and means to normal position when pressure is relieved from said means, means for automatically locking the gates in inoperative position, means for causing the automatic release of the gates at the beginning of the operation of said pressure operated means, and means for limiting the movement of the gates in either direction.

3. A cattle guard comprising a pair of shafts, a gate carried by each of the shafts and adapted when the shafts are moved in one direction to swing to a position transverse of a railway track, adjustable bearings for each end of the shafts, the bearings for one end of the shafts provided with means to allow such ends to be vertically moved and each further provided with an inwardly extending lug, protuberances carried by the shafts and adapted to engage the lugs for retaining the gates in an upright position, and means connected with the shafts for moving the protuberances below the lugs and for shifting the shafts in one direction causing thereby the swinging of the gates over the railway track.

4. A cattle guard comprising a pair of shafts, a gate carried by each of the shafts and adapted when the shafts are moved in one direction to swing to a position transverse of a railway track, adjustable bearings for each end of the shafts, the bearings for one end of the shafts provided with means to allow such ends to be vertically moved and each further provided with an inwardly extending lug, protuberances carried by the shafts and adapted to engage the lugs for retaining the gates in an upright position, means connected with the shafts for moving the protuberances below the lugs and for shifting the shafts in one direction causing thereby the swinging of the gates over the railway track, and counterbalance means connected to the shafts for automatically returning the shafts and gates to inoperative position.

5. A cattle guard comprising a pair of shafts, a gate carried by each of the shafts and adapted when the shafts are moved in one direction to swing to a position transverse of a railway track, adjustable bearings for each end of the shafts, the bearings for one end of the shafts provided with means to allow such ends to be vertically moved and each further provided with an inwardly extending lug, protuberances carried by the shafts and adapted to engage the lugs for retaining the gates in an upright position, means connected with the shafts for moving the protuberances below the lugs and for shifting the shafts in one direction causing thereby the swinging of the gates over the railway track, and means connected to the shafts for automatically returning the shafts and gates to inoperative position.

6. A cattle guard comprising a pair of shafts, a gate carried by each of the shafts and adapted when the shafts are moved in one direction to swing to a position transverse of a railway track, adjustable bearings for each end of the shafts, the bearings for one end of the shafts provided with means to allow such ends to be vertically moved and each further provided with an inwardly extending lug, protuberances carried by the shafts and adapted to engage the lugs for retaining the gates in an upright position, means connected with the shafts for moving the protuberances below the lugs and for shifting the shafts in one direction causing thereby the swinging of the gates over the railway track, counterbalance means connected to the shafts for automatically returning the shafts and gates to inoperative position, and means for limiting the movement of the gates in either direction.

7. A cattle guard comprising a pair of shafts, supporting means therefor, a gate connected to each of the shafts, a plurality of vertically movable slatted frames, crank shafts for suspending said frames adapted to be actuated when pressure is applied to the frames, and connections between the crank shafts and the first mentioned shafts for operating the latter when the crank shafts are actuated by the frames causing thereby the swinging of the gates over a railway track.

8. A cattle guard comprising a pair of shafts, supporting means therefor, a gate connected to each of the shafts, a plurality of vertically movable slatted frames, crank shafts for suspending said frames adapted to be actuated when pressure is applied to the frames, connections between the crank shafts and the first mentioned shafts for operating the latter when the crank shafts are actuated by the frames causing thereby the swinging of the gates over a railway track, counterbalance means connected with the shafts carrying the gates for automatically returning the frames, crank shafts, gate carrying shafts, and gates to normal position, and means for automatically locking the gates in normal position, said means released when the crank shafts are operated.

In testimony whereof I have hereunto set my hand in presence of two subscribing witnesses.

GEORGE W. CLINE.

Witnesses:
  JOHN MARSHALL,
  HERMAN N. TAYLOR.